(12) United States Patent
Bove et al.

(10) Patent No.: US 10,273,912 B2
(45) Date of Patent: Apr. 30, 2019

(54) INTERNAL COMBUSTION ENGINE WITH AMPLIFIED MAGNETIZING EFFECT

(71) Applicant: TITANO S.R.L., Naples (IT)

(72) Inventors: Alessandro Bove, Naples (IT); Fabrizio Bove, Naples (IT)

(73) Assignee: TITANO S.R.L., Naples (NA) (IT)

( * ) Notice: Subject to any disclaimer, the term of this patent is extended or adjusted under 35 U.S.C. 154(b) by 48 days.

(21) Appl. No.: 15/508,156

(22) PCT Filed: Aug. 25, 2015

(86) PCT No.: PCT/IB2015/056427
§ 371 (c)(1),
(2) Date: Mar. 2, 2017

(87) PCT Pub. No.: WO2016/034985
PCT Pub. Date: Mar. 10, 2016

(65) Prior Publication Data
US 2017/0284344 A1 Oct. 5, 2017

(30) Foreign Application Priority Data
Sep. 2, 2014 (IT) .............................. RM2014A0489

(51) Int. Cl.
*F02M 27/04* (2006.01)
*B60K 15/03* (2006.01)
(Continued)

(52) U.S. Cl.
CPC ........... *F02M 27/045* (2013.01); *B60K 15/03* (2013.01); *F01P 11/00* (2013.01); *F02M 37/22* (2013.01);
(Continued)

(58) Field of Classification Search
CPC ....... F02M 27/045; F02M 37/22; F01P 11/00; B60K 15/03; B60K 2015/03486; Y02T 10/126; F02B 51/04
See application file for complete search history.

(56) References Cited

U.S. PATENT DOCUMENTS 5,085,768 A * 2/1992 Murakami .............. B03C 1/286
123/198 C
5,329,911 A * 7/1994 Jeong ................... F02M 27/045
123/538
(Continued)

FOREIGN PATENT DOCUMENTS

EP 2 388 466 A1 11/2011
WO 2012/143804 A1 10/2012

OTHER PUBLICATIONS

International Search Report, dated Feb. 8, 2016, from corresponding PCT application.

*Primary Examiner* — Joseph J Dallo
(74) *Attorney, Agent, or Firm* — Young & Thompson

(57) ABSTRACT

An internal combustion engine includes: at least one magnet (10) inserted into at least one immersion container (8) present in the fuel tank (3), at least one magnet (20) applied on the cooling duct; at least one pair of magnets (30) arranged on the fuel duct, the fuel duct defining a coil; at least one pair of magnets (40) applied on the air suction pipe; and at least one pair of magnets (50) applied on the fuel filter, the magnets (10), (20), (30), (40) and (50) being permanent magnets including rare earth elements. The internal combustion engine includes at least one metal sheet (1) including paramagnetic and/or ferromagnetic elements applied on at least one portion of at least one internal surface (2) of the tank (3).

16 Claims, 9 Drawing Sheets

(51) Int. Cl.
  *F01P 11/00*  (2006.01)
  *F02M 37/22*  (2019.01)
  *F02B 51/04*  (2006.01)
(52) U.S. Cl.
  CPC ..... *B60K 2015/03486* (2013.01); *F02B 51/04* (2013.01); *Y02T 10/126* (2013.01)

(56) References Cited

U.S. PATENT DOCUMENTS

| | | | | |
|---|---|---|---|---|
| 5,460,144 | A * | 10/1995 | Park | F02M 27/045 123/538 |
| 5,547,585 | A * | 8/1996 | Shepherd | B01J 47/018 210/673 |
| 6,439,207 | B1 | 8/2002 | Liu | |
| 2003/0101973 | A1 | 6/2003 | Hricak | |
| 2003/0145653 | A1* | 8/2003 | Kramp | G01F 23/68 73/314 |
| 2005/0193960 | A1* | 9/2005 | Lee | F02M 27/04 123/1 A |
| 2005/0241626 | A1* | 11/2005 | Hashimoto | C10G 32/02 123/538 |
| 2007/0131205 | A1 | 6/2007 | Wang et al. | |
| 2011/0271589 | A1* | 11/2011 | Sakuma | F02M 27/045 44/639 |
| 2014/0026856 | A1* | 1/2014 | Bove | F02M 27/04 123/445 |

\* cited by examiner

INTERNAL COMBUSTION ENGINE WITH AMPLIFIED MAGNETIZING EFFECT

FIELD OF THE INVENTION

The present invention relates to the mechanical field. In more detail, the present invention relates to the field of internal combustion engines. In even more detail, the present invention relates to a new and innovative internal combustion engine which is provided with components that make it possible to markedly reduce the consumption of fuel and the diffusion of pollutant compounds and to considerably improve the yield of the engine itself. All this is made possible by taking advantage of the phenomenon of magnetization, induced by special magnets and/or infrared-ray emitting ceramics on substrates that exhibit different properties when immersed in a magnetic field.

STATE OF THE ART

For many years it has been known that magnetizing fuel induces a beneficial effect on the performance levels of internal combustion engines. In more detail, it has been observed that, by magnetizing the fuel or by irradiating it with infrared rays, energy consumption decreases and harmful emissions are reduced. In light of these experimental observations, in the last few decades devices have been developed which are specially designed to induce the magnetization of fuel in engines. However, given the diamagnetic behavior of most of the substances that make up the fuel, the effect of the magnetization induced by the magnets on the molecules present in it is relatively mild and furthermore it tends to degrade over time. For these reasons, several solutions which are currently proposed indicate that magnetization of the fuel must occur by immersing the magnets inside the tank in which it is contained so as to ensure that the phenomenon induced is as constant and long-lasting as possible during combustion. A recent and innovative solution that, by taking advantage of the phenomenon of magnetization induced by magnets, makes it possible to obtain high performance levels from the engine is disclosed in patent no. WO2012143804. The above mentioned document, of which the present invention is an evolution, relates to a method of treatment of the substances that are directly and indirectly involved in the combustion reactions of internal combustion engines, thanks to a set of devices comprising magnetic elements that, conveniently positioned on the fuel duct; inside an immersion container or containers present in the tank containing the fuel; and on the cooling duct and on the air feed duct, induce effects that, unexpectedly, optimize the reaction conditions during the combustion. All this is with the result of improving the performance of the engine overall in terms of reducing energy consumption, and reducing harmful emissions. In more detail, the substances and mixtures of substances that interact with the magnetic field generated are: fuel, air, and cooling water. As is known, these substances do not have the same properties when immersed in a magnetic field. Water and fuel are in fact diamagnetic substances for which induced magnetization has the opposite sense with respect to that of the applied magnetic field, with the result that said substances are weakly repelled by the field. Differently, paramagnetic substances, such as for example the molecular oxygen contained in air, when they are in the presence of a magnetic field, exhibit a magnetization with the same direction and sense as that associated with the external field. Paramagnetic materials have magnetic dipoles that align with the external field, and so are weakly attracted to them. The invention disclosed in the WO2012143804 document arose from studies carried out on combustion reactions, in internal combustion engines, in the presence of applied magnetic fields. More specifically, it discloses a system that optimizes the performance levels of these engines thanks to a set of magnetic devices which are specially positioned in specific points of the engine. In more detail said devices are:

1) At least one box-like immersion container, represented by a conventional container which is conveniently perforated with a plurality of openings adapted to facilitate the direct contact of the fuel with a plurality of magnetic elements positioned inside said immersion container. This latter item is furthermore stably fixed to the inside of the fuel tank with adapted welded brackets which render it stably coupled to the inside of the tank, taking account of the particular use of the engine, the size of the tank and its application on engines such as: aircraft engines, watercraft engines, or any other means of aerial or terrestrial locomotion, independently of whether it moves on rails, tires, or link tracks. The immersion container must preferably be arranged proximate to the exit duct of the fuel. Inside the immersion container or containers arranged in the tank containing the fuel, at least one solid container of any shape, preferably cylindrical, is accommodated and contains internally a plurality of magnetic elements represented by permanent magnets with a disk-like profile and which comprise some elements of the group of rare earth elements, such as samarium-cobalt-neodymium magnets. Interposed between said magnetic disk-like elements are ceramic spacers, which also have a disk-like profile and are conveniently spaced apart in order to optimize the magnetic effect. Said solid containers, preferably cylindrical, are in turn stably anchored to the bottom of the immersion container in order to facilitate their contact with the fuel on which they are to have their magnetizing effect. The anchoring occurs by way of stable locking systems such as screws or brackets, so as to conveniently space said solid containers apart from each other by at least 3 cm, so as to contribute to optimizing the magnetic field generated. Each solid container, arranged inside the immersion container which in turn is arranged inside the tank as close as possible to the exit point of the duct to feed the engine and thus treating the maximum quantity of fuel, is made so as to favor as far as possible contact between the fuel contained in the tank and said magnetic elements. The materials with which the above mentioned containers are made are varied in nature, as long as they are insoluble when immersed in fuel. Their shape can also vary and their dimensions are obviously proportional to those of the engine on which they are to be applied. The indicative height of each cylindrical container and, consequently, of the immersion element vary, as a function of the supply flow rate and of the type of engine being subjected to the magnetization process, from a minimum height of 6 cm, ideal for the tanks of motorcycles, to well over 100 cm in height for inducing magnetization in the engines of ships; preferably the height of each cylindrical container is from 20 to 40 cm, and the optimal height is 30 cm. The density of the magnetic flux generated by the container, when fitted with the magnetic disks and with the ceramic spacers, is of the order of 1.17 teslas. The magnetic disks comprise rare earth elements, preferably neodymium.

2) The second device is represented by a solid structure with a parallelepiped shape into which the fuel pipe originating from the tank in which the above mentioned immersion container is contained enters, following a series of folds and/or curves so as to create a coil and/or a winding of pipes so that a plurality of further magnets can be stably accommodated. The coil and/or the winding of the pipes makes it possible to contribute to making the magnetization that was previously induced in the fuel last longer. In fact, the fuel that flows within the duct that makes up the coil, by passing proximate to the magnets present thereupon, is magnetized by said magnets which are made of ferrite and/or with rare earth elements such as those made of neodymium and/or of samarium-cobalt.

3) The third device is represented by a set of pairs of magnets which are positioned proximate to the mechanical fuel supply pump and/or proximate to the point of injection of the fuel into the combustion chamber of the engine. Furthermore, these pairs of magnets can be covered by a plurality of neodymium washers which are adapted to further increase the magnetic field applied. These magnets furthermore have a curved profile, and therefore have convexities and concavities to ensure that their adaptation to the surfaces of the components on which they are installed is optimal.

4) The fourth device is represented by a further set of magnets, on which neodymium washers are optionally applied, and which are arranged radially on the air suction pipe by a retaining band. The temperature that said magnets must withstand is at least 110° C.

5) The fifth device is represented by a plurality of magnets installed on the cooling duct connected to the radiator of the internal combustion engine and which magnetize the water and/or the cooling liquid. For these substances, i.e. the water and the cooling liquid, the magnetization will have an opposite sense to that of the external magnetic field, similarly to what occurs for the fuel, since they too are diamagnetic.

6) The sixth device is also represented by a set of magnets which are, however, arranged around the fuel filter connected to the internal combustion engine. In this case too, the profile of the magnets is such that the adaptation of said magnets on the surface of the component on which they are installed is optimal.

The system that comprises the above mentioned devices is installable on any internal combustion engine independently of whether it runs on Diesel fuel, gasoline, LPG, methane, kerosene or any other fuel.

The invention disclosed in the WO2012143804 document relates therefore to an efficient system of magnets that markedly optimizes the performance levels of the engine. The aim of the present patent application for an industrial invention, which is described in detail below, is to add further components to the internal combustion engine disclosed in the WO2012143804 document which, owing to their chemical-physical properties and their specific positioning in the engine, provide a marked increase in the technical effect obtained with the invention in the above mentioned patent. All this is made possible while also considerably improving the performance levels of any internal combustion engine.

DESCRIPTION

The present patent application for an industrial invention describes a new and innovative type of internal combustion engine to be installed on vehicles for land, water and/or aerial use. In more detail, the present description relates to an internal combustion engine that has a plurality of magnetic components which are adapted to magnetize the fuel, the air, the water and/or the cooling liquid as described in the WO2012143804 document. The engine in the present invention is characterized in that it comprises, in addition to the above mentioned magnetic components, a further component that considerably enhances the desired technical effect, i.e. that of improving the performance levels of the engine in terms of reducing consumption and reducing harmful emissions. In more detail, the invention in question relates to an internal combustion engine which is characterized in that it comprises at least one metal sheet that has paramagnetic or ferromagnetic properties, and is to be placed on at least one portion of the surface of at least one internal wall of the tank in which the fuel is contained. The sheet of metal can be a sheet with a surface that is visibly uniform and flat, or it can have perforations, thus representing a net-like structure, or it can have polyhedral reliefs such as prismatic reliefs.

As previously mentioned and as will be described in detail below, the metal sheet comprised in the internal combustion engine in the present description can be made of a material that comprises or is constituted entirely by: paramagnetic elements such as aluminum, platinum, wolfram etc., or it can be made of a material that comprises or is constituted entirely by: ferromagnetic elements such as iron, nickel, cobalt etc. The sheet of metal that characterizes the internal combustion engine is represented by portions of said sheet arranged in front of each other inside the tank, therefore on opposite walls, so as to provide an effect that is as symmetric as possible on the fuel present inside the tank of the internal combustion engine. Preferably, but not necessarily, the sheet of metal covers the entire surface of the internal walls of the fuel tank. It should be noted that the invention in question, in addition to relating to the engine comprising the above mentioned metal sheet and said metal sheet, also relates to the method of treatment, with a sheet of metal which has paramagnetic or ferromagnetic properties, of the fuel magnetized with the device described in the WO2012143804 document. Therefore the invention in question also relates to the method of treatment with the immersion container which internally comprises the plurality of cylinders containing the cluster of magnetic disks spaced apart by ceramic disks.

In more detail, this figure shows that the metal sheet 1 of paramagnetic and/or ferromagnetic material has a surface with polyhedral reliefs 6. Preferably said reliefs 6 are prismatic or pyramid-shaped as shown in the figure. Said reliefs 6 have the vertices 7 directed toward the inside of the tank 3 in which the fuel is contained, i.e. toward the fuel.

Figure 1:
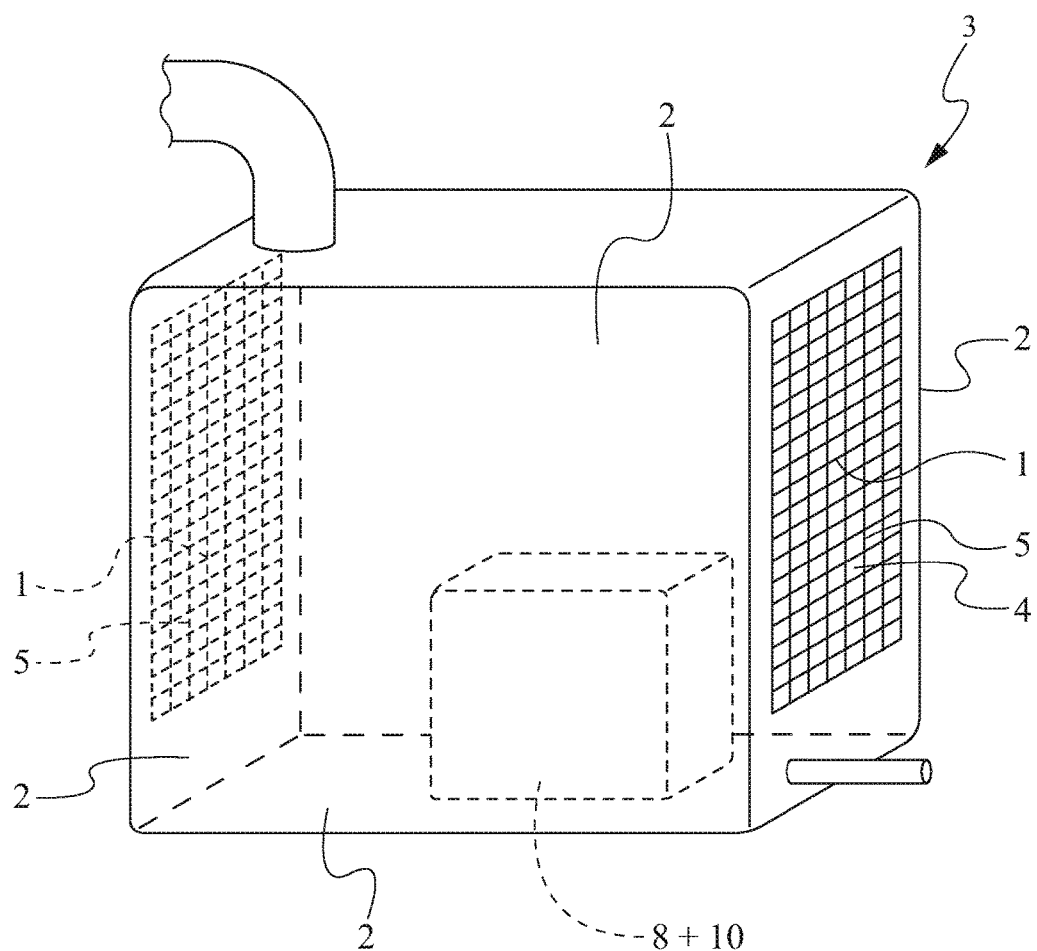
FIG. 1 is a perspective view of the tank 2 of the internal combustion engine in the present patent application for an industrial invention, in a particular embodiment. In more detail, the figure shows that said tank 2, adapted to contain the fuel, internally comprises the box-like container 8 which is adapted to magnetize said fuel thanks to a plurality of magnets 10 (not shown in the figure) which are contained inside it; and to the metal sheets 1 arranged on the surfaces 2 of the internal walls of said tank 3. The sheets 1 are made of metal that comprises or is constituted entirely by paramagnetic or ferromagnetic elements. Said sheet 1 is adapted to boost the effect of the magnetic field produced by the box-like container 8 on the fuel. The figure shows, in particular, an embodiment in which the metal sheets 1, which are fixed on opposite inner surfaces 2, have a rectangular profile and a net-like structure with perforations 4 defined by the meshes 5 of paramagnetic and/or ferromagnetic metal. Both the profile of the perforations 4 and the profile of the transverse section of the meshes 5 can be defined by any closed shape or polygonal shape.
Figure 2:
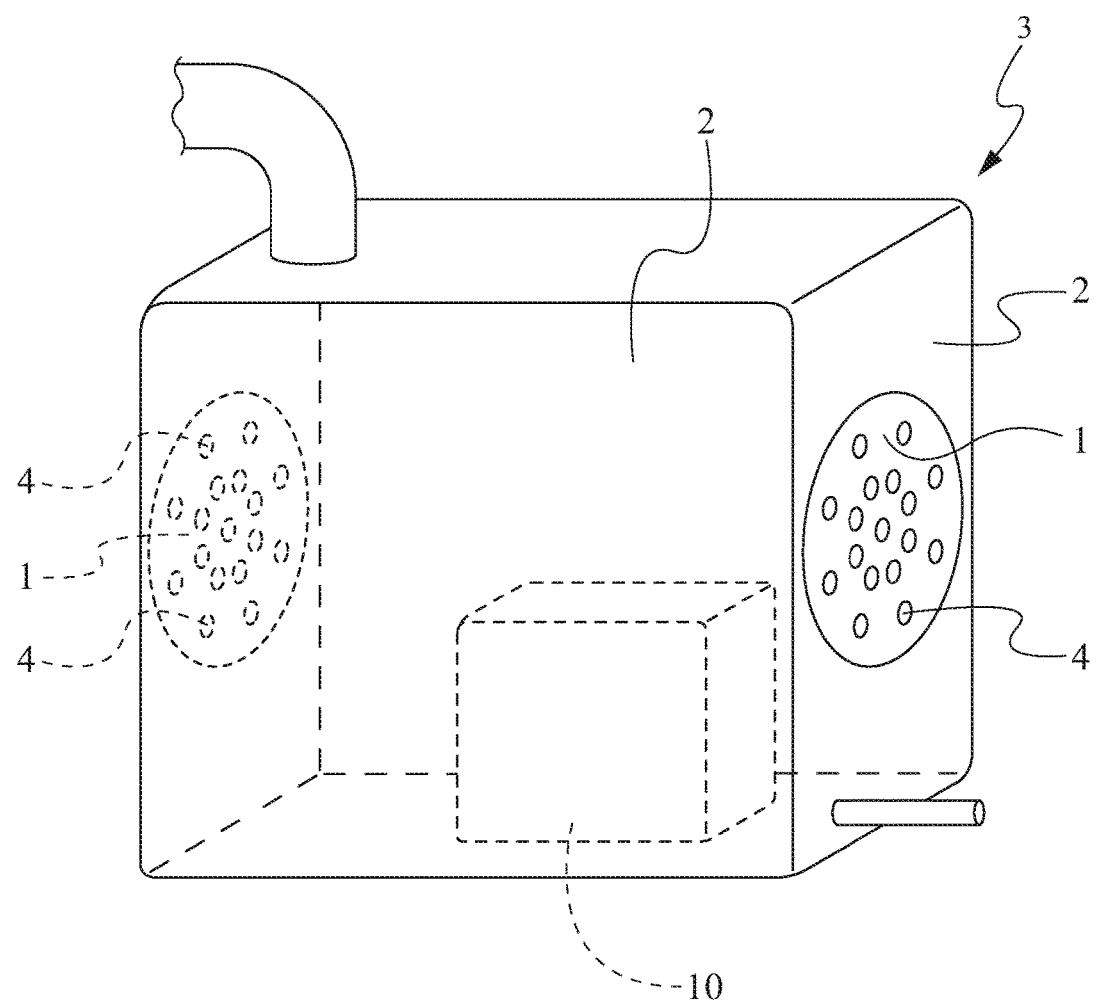
FIG. 2 shows a particular embodiment of the invention in which the metal sheets 1 have a circular profile and circular perforations 4 and are arranged on opposite surfaces 2 of the internal walls of the tank 3 containing the fuel.
Figure 3:
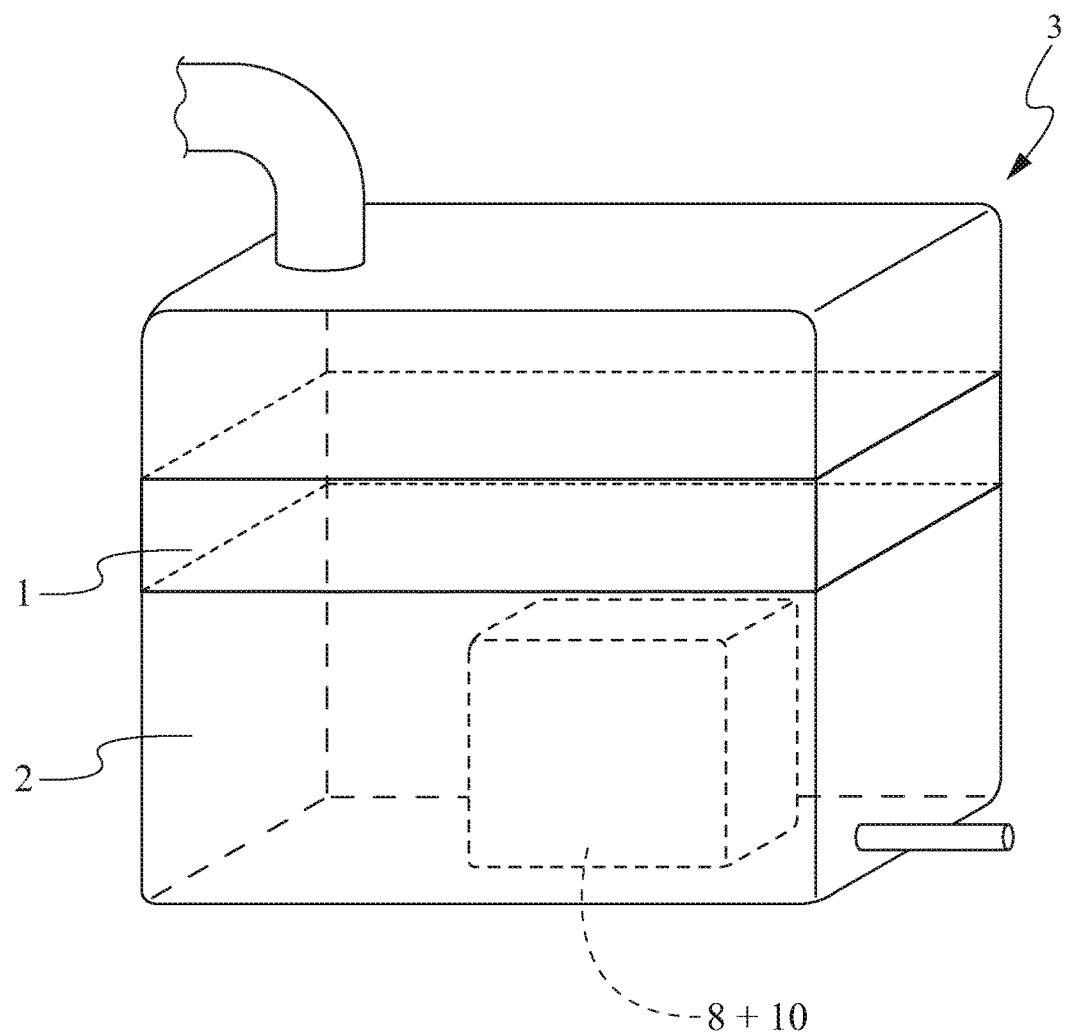
FIG. 3 shows a particular embodiment of the invention in which the metal sheet 1 of paramagnetic and/or ferromagnetic material, which characterizes the invention in question, is represented by a metal band which runs continuously over the surfaces 2 of the internal lateral walls of the tank 3 at about half-height of said tank 3. In this peculiar embodiment shown in the figure, the sheet 1 has a flat and uniform surface.
Figure 4:
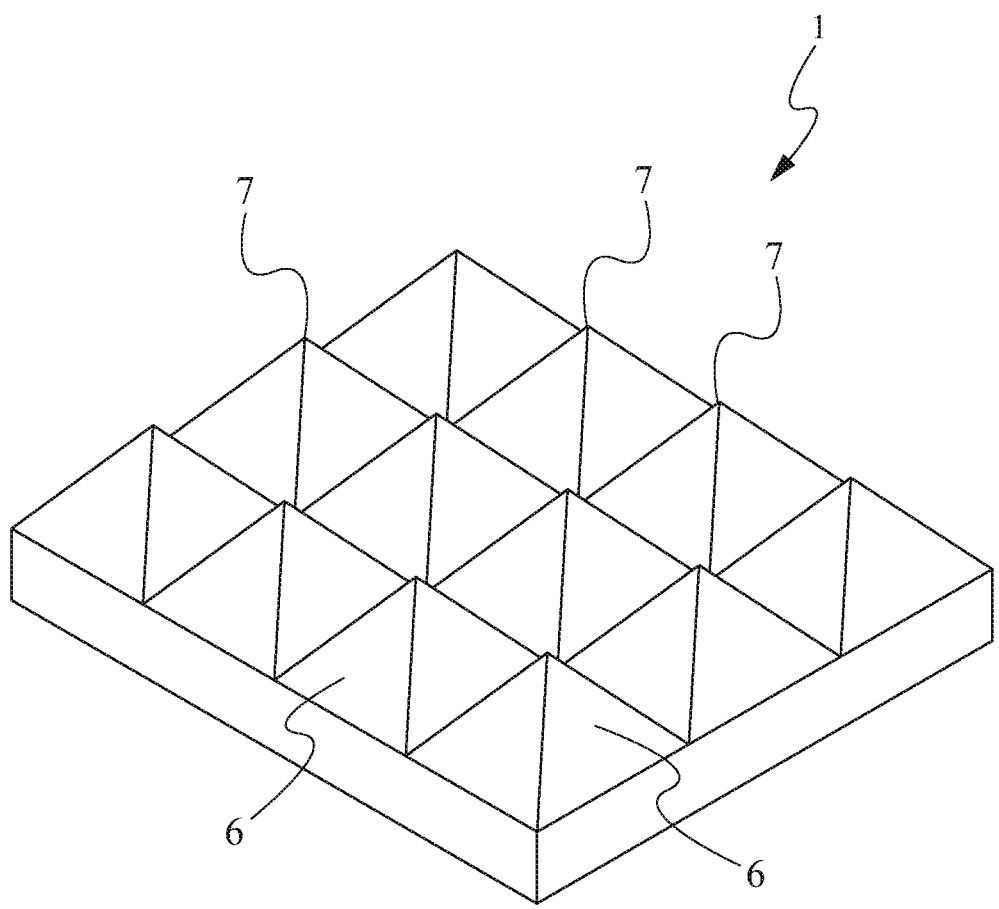
FIG. 4 shows a peculiar embodiment of the invention which is found to be particularly effective for the aims of the present invention, i.e. for improving the performance levels of the entire internal combustion engine.
Figure 5:
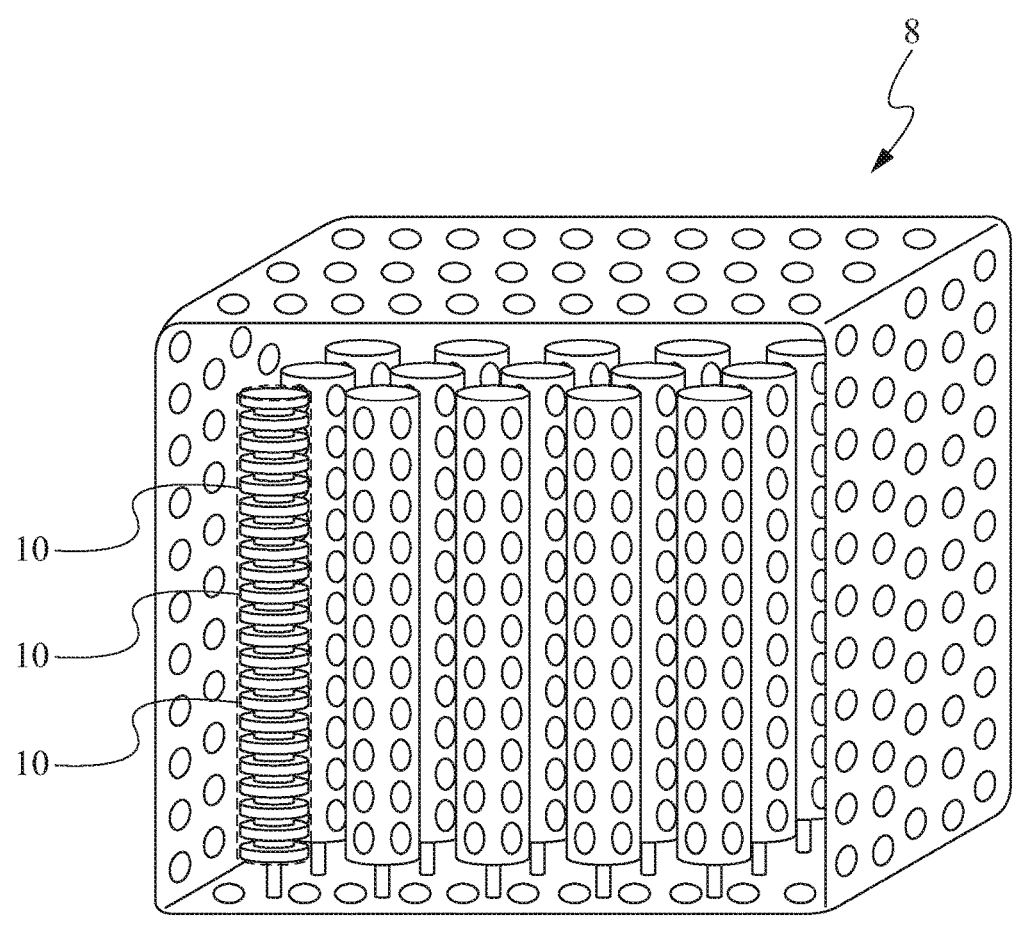

FIG. 5 is a perspective view of the immersion container 8 present inside the fuel tank 3. Said container is described in detail in the WO2012143804 document. The figure highlights the presence of the magnets 10 adapted to induce the magnetization of the fuel inside the tank 3. Said magnets 10 are described in detail in the cited document.

Figure 6:
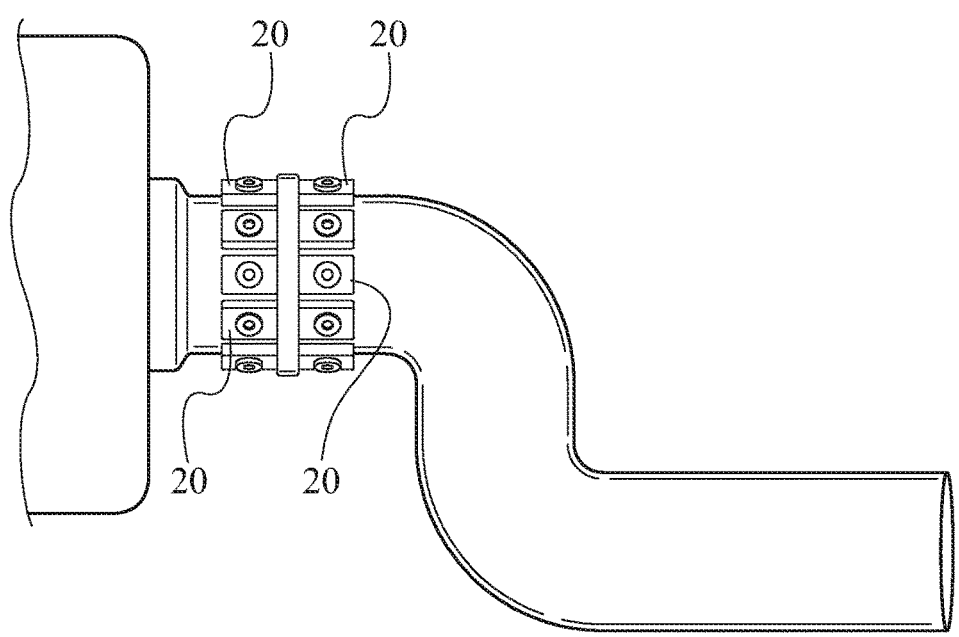

FIG. 6 is a side view of the cooling duct on which a plurality of magnets 20 are applied, which are optionally provided with neodymium washers. Said magnets 20 and their installation on the combustion engine in the invention are described in detail in the WO2012143804 document.

Figure 7:
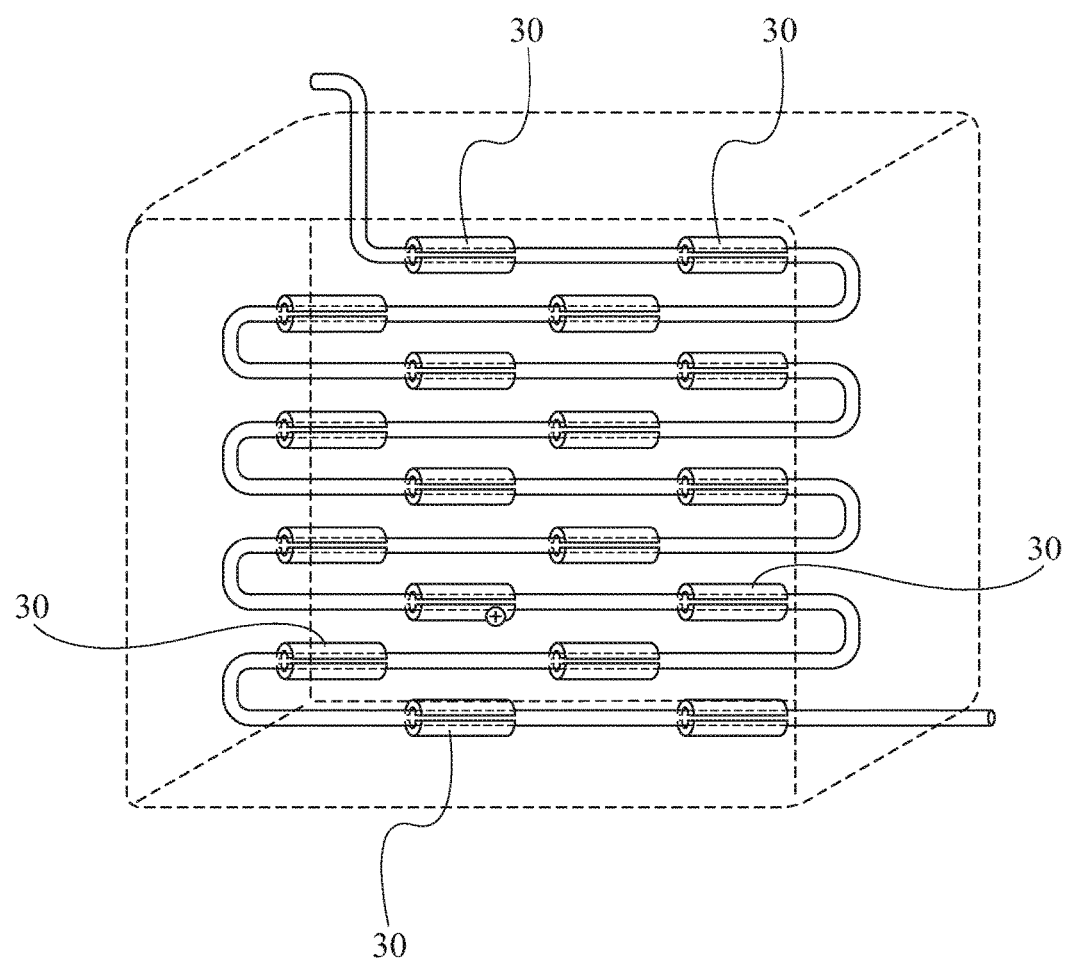

FIG. 7 is a perspective view of the duct for the fuel which continues to be magnetized thanks to a plurality of pairs of magnets 30. The profile of the fuel duct and of the box-like container adapted to accommodate the coil defined by the duct are also described in the above mentioned prior art document.

Figure 8:
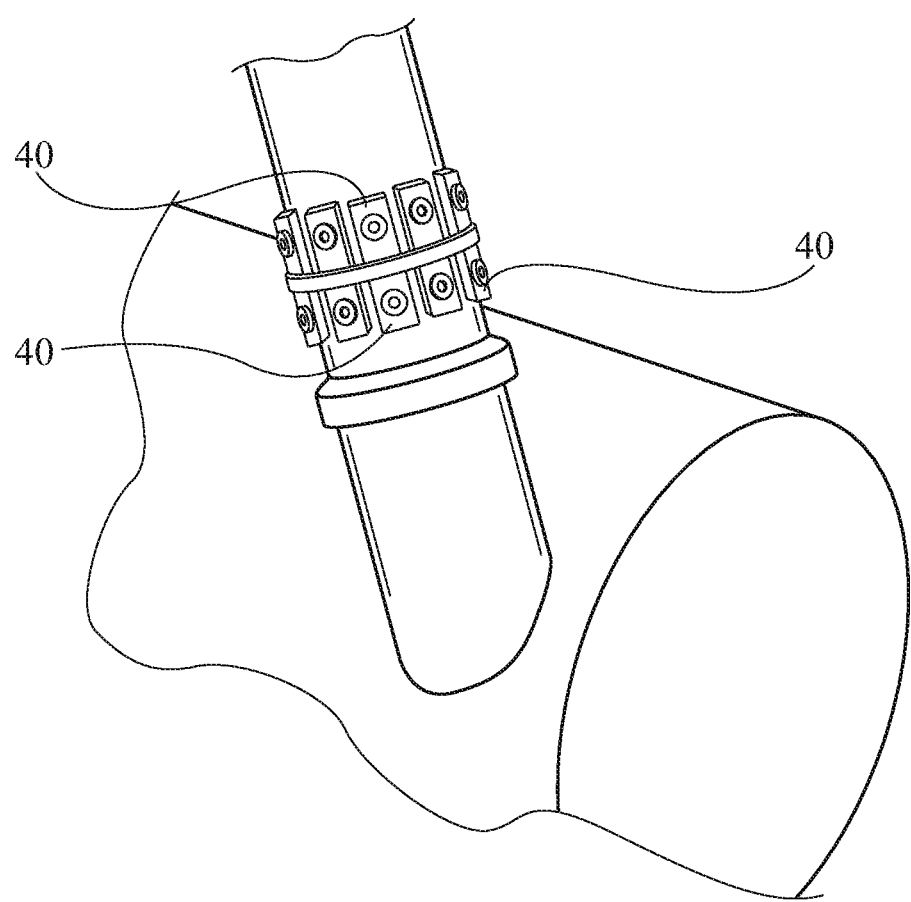

FIG. 8 is a perspective view of the air suction pipe on which a plurality of pairs of magnets 40 can be seen, which are optionally provided with neodymium washers. Said magnets 40 are described in the WO2012143804 document.

Figure 9:
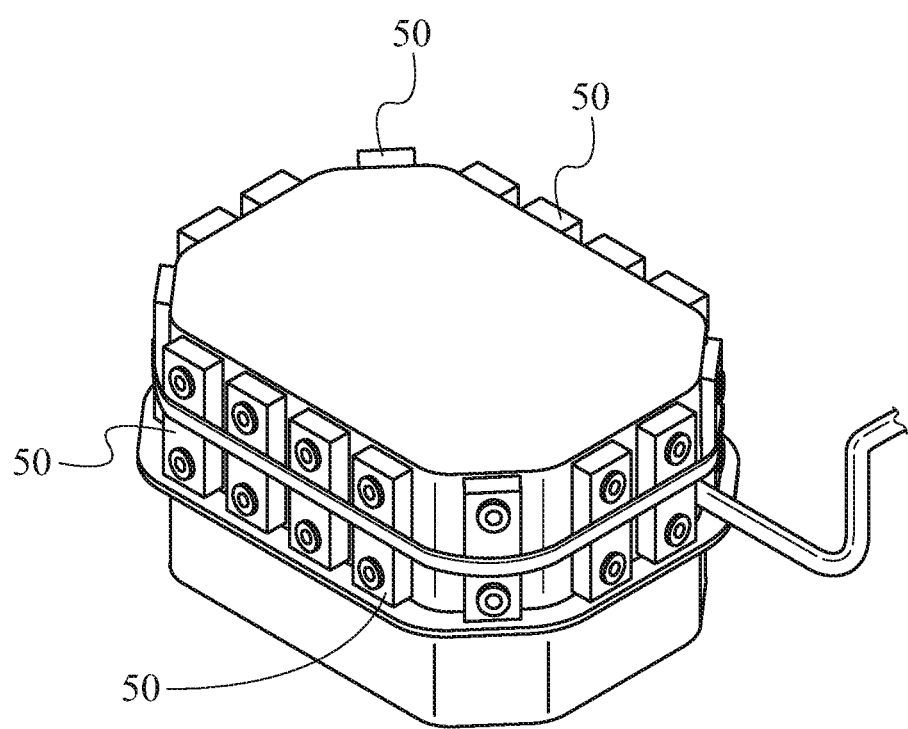

FIG. 9 is a perspective view of the magnets 50 suitably installed on the fuel filter. Said magnets 50 and their installation on the fuel filter are described in the WO2012143804 document.

DESCRIPTION OF THE PREFERRED EMBODIMENTS

In all its embodiments, the internal combustion engine in the present patent application for an industrial invention comprises a plurality of magnetic devices which make it possible to considerably improve the performance levels of said engine in terms of reducing energy consumption and reducing harmful emissions, as well as offering further advantages. In more detail, the internal combustion engine in question comprises at least one immersion container 8 containing a plurality of magnets 10 fixed inside the tank in which said fuel is contained; at least one pair of magnets 20 arranged on the cooling duct; at least one pair of magnets 30 arranged on the fuel duct; at least one pair of magnets 40 arranged on the air supply duct and at least one pair of magnets 50 on the fuel filter. Said magnets, thus arranged, make it possible to magnetize: the fuel, the air, and the cooling liquid. The resulting effect will be a spatial orientation of the dipoles of the molecules of these substances, which will depend on their magnetic properties: basically, the fuel and the water, being diamagnetic, will have a magnetization of opposite sense to the sense of the magnetic field applied, being weakly repelled by it. The oxygen in the air on the other hand, being paramagnetic, will be oriented in the same sense as the external magnetic field, being weakly attracted to it. The engine in question is characterized in that it comprises, in addition to the above mentioned components, at least one metal sheet 1 to be placed on at least one portion of at least one of the internal surfaces 2 of the tank 3 in which the fuel is contained. Said metal sheet 1 comprises elements with paramagnetic properties such as, for the purposes of non-limiting example, aluminum, platinum or tungsten, or elements with ferromagnetic properties such as iron, nickel and cobalt. As previously mentioned, said metal sheet can be variously applied to the internal surfaces 2 of the tank 3. Thus, in a peculiar embodiment of the invention, said sheet 1 completely covers the internal wall of the tank 3. Furthermore said sheet 1 has a surface that is flat and uniform. Alternatively, and in another embodiment of the invention in question, the sheet 1 has perforations 4 which give said sheet 1 a net-like structure overall. Said perforations 4 have a profile defined by any closed curve or polygonal shape. For the purposes of non-limiting example, said perforations 4 can be circular or rhomboid. Furthermore, when said sheet 1 has a net-like structure, the profile of the meshes 5 can also vary and it too can be defined by any closed curve or polygonal shape. As previously mentioned, in some embodiments, the sheet 1 exhibiting paramagnetic or ferromagnetic properties only partially covers the internal surface of the tank 3. For example, in some embodiments the tank 3 has at least one metal sheet 1 arranged on a surface 2 and at least one other metal sheet 1 arranged on the opposite surface 2, so that said sheets 1 are mirror-symmetrical, thus contributing to inducing a magnetization of the fuel which is as symmetrical as possible. When the sheet or sheets 1 only partially cover the surface or surfaces 2, it has or they have, similarly to the perforations 4 if any, a profile defined by any closed curve or polygonal shape. For example in a particular embodiment of the invention, the engine comprises a tank 3 in which there is a metal sheet 1 with a circular profile located on a surface 2 of one of the internal lateral walls of the tank 3, and another metal sheet 1, similar to the first, fixed on the opposite surface 2. The fixing of said metal sheet or sheets 1 occurs with conventional means and mechanisms. Preferably the fixing occurs using common screws.

In a peculiar embodiment of the present invention, the metal sheet 1, independently of whether it totally or partially covers the surface 2 of the internal walls of the tank 3, has 6 polyhedral the reliefs, preferably prismatic or pyramid-shaped with the vertices 7 directed toward the inside of the chamber of the tank containing the fuel. This embodiment is found to be particularly effective for the aims of the present invention. The internal combustion engine in question is found in fact to be particularly attractive in terms of reducing energy consumption and, as a consequence, reducing harmful emissions. A possible explanation of the improvement found in the performance levels of the engine could be provided by considering the following: in the presence of the magnetic field generated by the magnets of the immersion container 8, the orientation of the dipoles or of the dipole domains, of the paramagnetic or ferromagnetic material of the sheet 1, in the same sense as the magnetic field applied, would appear to tend to increase their population density at the vertices 7 of the polyhedrons. The result of this spatial configuration of the dipoles would appear to imply a greater repulsion exerted on the molecules of fuel which, being diamagnetic, would appear to be repelled more markedly by the surface of the sheet 1 and thus by the magnetic field, with consequently increased Brownian motion and probability of intermolecular collision. The latter would appear to cause an increase in the energy of the system and the possible attainment of the activation energies of high energy activated complexes, which would not form under conventional conditions, with the result that the combustion reaction is conducted to completion and without the formation of unwanted subproducts.

In all its embodiments the metal sheet or sheets 1 which comprises paramagnetic and/or ferromagnetic elements has a thickness comprised between 1 mm and 3 cm, and preferably said metal sheet 1 has a thickness of 5 mm. The term magnet, in the present patent application for an industrial invention, means any permanent magnet that can be sourced on the market or any electromagnet with fixed or variable actuation, i.e. programmed with variable frequencies, optionally associated with a magnet and/or with a conventional device for emitting infrared rays, which also has a fixed or variable actuation.

The term fuel duct, in the present patent application for an industrial invention, means the possibility of making the fuel itself flow through multiple passages of the same fuel duct, in order to be able to amplify the effects on it. Said passes are achieved by way of any fixed or mobile and/or electronic redirecting device.

The term air duct, in the present patent application for an industrial invention, means the possibility of making the air flow through multiple passages of the same treated air duct, in order to be able to amplify the effects on it, by way of any fixed or mobile and/or electronic redirecting device.

The term cooling liquid duct, in the present patent application for an industrial invention, means the possibility of making the cooling liquid flow through multiple passages of the same cooling liquid duct, in order to be able to amplify the effects on it, by way of any fixed or mobile and/or electronic redirecting device.

The invention claimed is:

1. An internal combustion engine comprising:
   at least one magnet (10) inserted into at least one immersion container (8) present in a fuel tank (3),
   at least one magnet (20) applied on a cooling duct;
   at least one pair of magnets (30) arranged on a fuel duct, said fuel duct defining a coil;
   at least one pair of magnets (40) applied on an air suction pipe; and
   at least one pair of magnets (50) applied on a fuel filter, said magnets (10), (20), (30), (40) and (50) being permanent magnets comprising rare earth elements,
   said internal combustion engine further comprising at least one metal sheet (1) comprising paramagnetic and/or ferromagnetic elements applied on at least one portion of at least one internal surface (2) of said tank (3),
   wherein the at least one metal sheet (1) has, on its surface to be faced towards the inside of the tank (3), polyhedral reliefs (6) each having a vertex (7) facing towards the fuel.

2. The internal combustion engine according to claim 1, wherein the metal sheet or sheets (1) have perforations (4) defined by meshes (5), said metal sheet or sheets having net-like structures.

3. The internal combustion engine according to claim 1, characterized in that the reliefs (6) are pyramid-shaped.

4. The internal combustion engine according to claim 1, wherein the reliefs (6) are prismatic.

5. The internal combustion engine according to claim 1, wherein the at least one metal sheet (1) extends continuously on all internal surfaces (2) of the tank (3).

6. The internal combustion engine according to claim 1, further comprising at least one strip-like metal sheet (1) extended on the surfaces (2) of the internal lateral walls of the tank (3) at half-height of said tank (3).

7. The internal combustion engine according to claim 1, wherein the at least one metal (1) sheet further comprises at least two metal sheets (1) to be placed on opposite surfaces (2) inside the tank (3).

8. The internal combustion engine according to claim 1, wherein the at least one metal (1) sheet comprises one or more of the elements from the group consisting of aluminum, platinum, wolfram, iron, cobalt, nickel.

9. The internal combustion engine according to claim 1, wherein the at least one metal sheet (1) has a thickness comprised between 1 mm and 3 cm.

10. A metal sheet (1), comprising paramagnetic and/or ferromagnetic elements having a surface having polyhedral reliefs (6) with vertices (7) facing towards fuel contained in a fuel tank (3).

11. A method to contain fuel in an internal combustion engine, the method comprising providing the metal sheet comprising paramagnetic and/or ferromagnetic elements of claim 10, and forming the metal sheet into a fuel container.

12. A method for magnetizing the fuel contained in a tank (3) which contains therein at least one pair of magnets (10), by way of the metal sheet (1) according to claim 10.

13. The internal combustion engine according to claim 3, wherein the at least one metal sheet (1) extends continuously on all internal surfaces (2) of the tank (3).

14. The internal combustion engine according to claim 2, wherein the at least one metal sheet (1) extends continuously on all internal surfaces (2) of the tank (3).

15. The internal combustion engine according to claim 8, wherein the at least one metal sheet (1) extends continuously on all internal surfaces (2) of the tank (3).

16. The internal combustion engine according to claim 4, wherein the at least one metal sheet (1) extends continuously on all internal surfaces (2) of the tank (3).

* * * * *